United States Patent
Wang

(10) Patent No.: US 10,223,229 B2
(45) Date of Patent: Mar. 5, 2019

(54) SYSTEM FOR MONITORING A TO-BE-MONITORED UNIT OF A RACK/CHASSIS MANAGEMENT CONTROLLER (RMC/CMC) ACCORDING TO HEARTBEAT SIGNALS FOR DETERMINING OPERATING MODES

(71) Applicant: MITAC COMPUTING TECHNOLOGY CORPORATION, Taoyuan (TW)

(72) Inventor: Po-Wei Wang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 288 days.

(21) Appl. No.: 15/276,184

(22) Filed: Sep. 26, 2016

(65) Prior Publication Data
US 2017/0139797 A1 May 18, 2017

(30) Foreign Application Priority Data
Nov. 18, 2015 (TW) .............................. 104138082 A

(51) Int. Cl.
| | | |
|---|---|---|
| H04L 12/24 | (2006.01) | |
| G06F 11/30 | (2006.01) | |
| G06F 1/20 | (2006.01) | |
| G06F 13/364 | (2006.01) | |
| G06F 13/40 | (2006.01) | |

(52) U.S. Cl.
CPC ......... *G06F 11/3027* (2013.01); *G06F 1/206* (2013.01); *G06F 11/3041* (2013.01); *G06F 11/3051* (2013.01); *G06F 13/364* (2013.01); *G06F 13/4068* (2013.01); *H04L 41/0659* (2013.01)

(58) Field of Classification Search
CPC .............................. G06F 11/3027; H04L 12/24
See application file for complete search history.

(56) References Cited

U.S. PATENT DOCUMENTS

| | | | |
|---|---|---|---|
| 9,842,003 B2 * | 12/2017 | Rao | ....................... G06F 9/5061 |
| 2012/0136489 A1 * | 5/2012 | Wang | ................. G05D 23/1934 |
| | | | 700/282 |
| 2015/0160627 A1 * | 6/2015 | Maddukuri | ............ G05B 15/02 |
| | | | 700/90 |

FOREIGN PATENT DOCUMENTS

| | | |
|---|---|---|
| TW | 201321943 A1 | 6/2013 |
| TW | 201527958 A | 7/2015 |

OTHER PUBLICATIONS

TW 104138082, Search Report dated Jul. 20, 2016.

* cited by examiner

*Primary Examiner* — Tammara R Peyton
(74) *Attorney, Agent, or Firm* — Michael Best & Friedrich LLP

(57) ABSTRACT

A system includes a bus, multiple BMCs, and a control unit. Each BMC generates heartbeat signals and acquire operation data associated with a to-be-monitored unit once being initiated, and operates in one of a master mode and a slave mode according to a corresponding decision signal. One of the BMCs which operates in the master mode is configured to receive via the bus the operation data from the rest of the BMCs which operate(s) in the slave mode for monitoring the to-be-monitored unit. The control unit is configured to, according to the heartbeat signals, generate the corresponding decision signals for controlling a first normally operating one of the BMCs to operate in the master mode and the rest of the BMCs to operate in the slave mode.

20 Claims, 3 Drawing Sheets

SYSTEM FOR MONITORING A TO-BE-MONITORED UNIT OF A RACK/CHASSIS MANAGEMENT CONTROLLER (RMC/CMC) ACCORDING TO HEARTBEAT SIGNALS FOR DETERMINING OPERATING MODES

CROSS-REFERENCE TO RELATED APPLICATION

This application claims priority of Taiwanese Patent Application No. 104138082, filed on Nov. 18, 2015.

FIELD

The disclosure relates to a system, and more particularly to a system for monitoring a to-be-monitored unit of a rack.

BACKGROUND

A rack generally includes a rack/chassis management controller (RMC/CMC), at least a rack backplane (RBP), at least a tray backplane (TBP), at least a node, a fan board (FB), and a power distribution board (PDB). Each rack backplane is connected to at least one tray backplane. Each tray backplane is connected to at least one node. Each node is a server node and includes a baseboard management controller (BMC). The fan board is connected to at least a fan. The power distribution board includes at least a power supply unit (PSU).

Referring to FIG. 1, a rack depicted therein includes an RMC/CMC 9, an RPB 91, two TBPs 93, 94, five nodes 931, 932, 941, 942, 943 respectively having five BMCs 933, 934, 944, 945, 946, an FB 95, three fans 951, 952, 953, a PDB 92, and three PSUs 921, 922, 923. The BMCs 933, 934 are electrically connected to the RMC/CMC 9 via the TBP 93 and the RBP 91. The BMCs 944, 945, 946 are electrically connected to the RMC/CMC 9 via the TBP 94 and the RBP 91. The three fans 951, 952, 953 are electrically connected to the BMCs 933, 934 via the FB 95, the RBP 91, and the TBP 93, and are electrically connected to the BMCs 944, 945, 946 via the FB 95, the RBP 91, and the TBP 94. The BMCs 933, 934, 944, 945, 946 are configured to monitor operation parameters associated with corresponding fans 951, 952, 953, for example, temperature and speed of rotation of each corresponding fan 951, 952, 953. The RMC/CMC 9 is configured to receive the operation parameters of the fans 951, 952, 953 from the BMCs 933, 934, 944, 945, 946, and to control, e.g., the speed of rotation of the fans 951, 952, 953 according to the operation parameters in order to adjust the temperature inside the rack. However, to have adequate communication interface and sensing interface, and sufficient computation ability for the RMC/CMC 9 requires a higher level control chip, so the cost is high. For lowering the cost, plenty of research and development in the relevant field has been performed in an attempt to use one of the BMCs to play the role of the CMC. One attempt wishes to make use of "handshaking" in deciding which of the BMCs is to take over the role of the CMC. However, due to complexity in hardware design and corresponding software implementation involved in realizing handshaking, such as not been successfully realized to date.

SUMMARY

Therefore, an object of the disclosure is to provide a system for monitoring a to-be-monitored unit of a rack with less complexity and lower cost.

According to the disclosure, a system for monitoring a to-be-monitored unit of a rack includes a bus, a plurality of baseboard management controllers (BMCs), and a control unit. The BMCs are electrically connected the to-be-monitored unit. Each of the BMCs is configured to generate a heartbeat signal and to acquire operation data associated with the to-be-monitored unit once completely initiated, and to operate in one of a master mode and a slave mode according to a corresponding decision signal. One of the BMCs which operates in the master mode is configured to receive via the bus the operation data from the rest of the BMCs which operate(s) in the slave mode. The control unit is electrically connected to the BMCs for receiving the heartbeat signals generated thereby, and is configured to, according to the heartbeat signals, generate the corresponding decision signals for the BMCs and transmit the corresponding decision signals respectively to the BMCs, for controlling a first normally operating one of the BMCs to operate in the master mode and the rest of the BMCs to operate in the slave mode.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
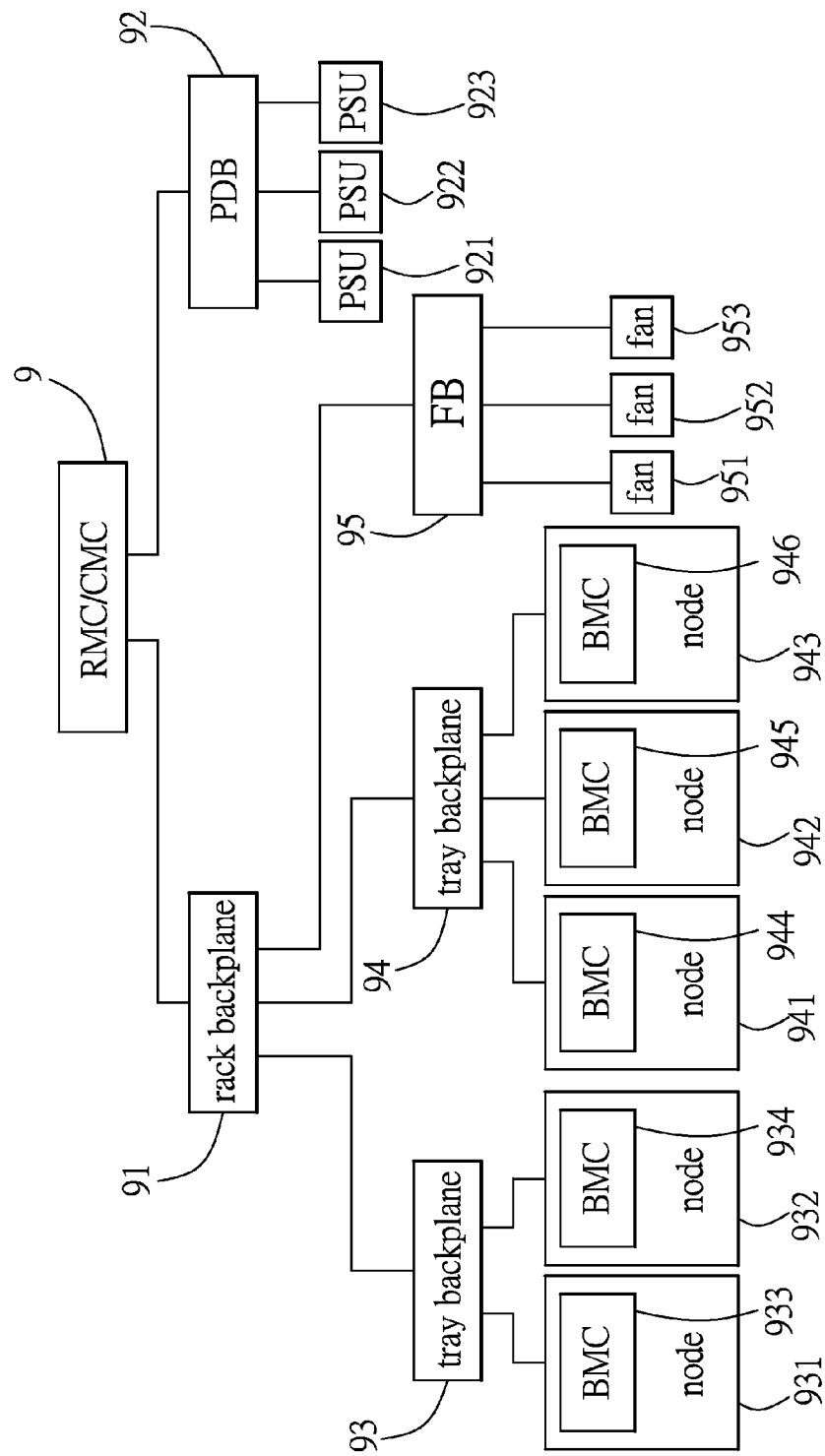
FIG. 1 is a block diagram illustrating a rack according to the prior art.
Figure 2:
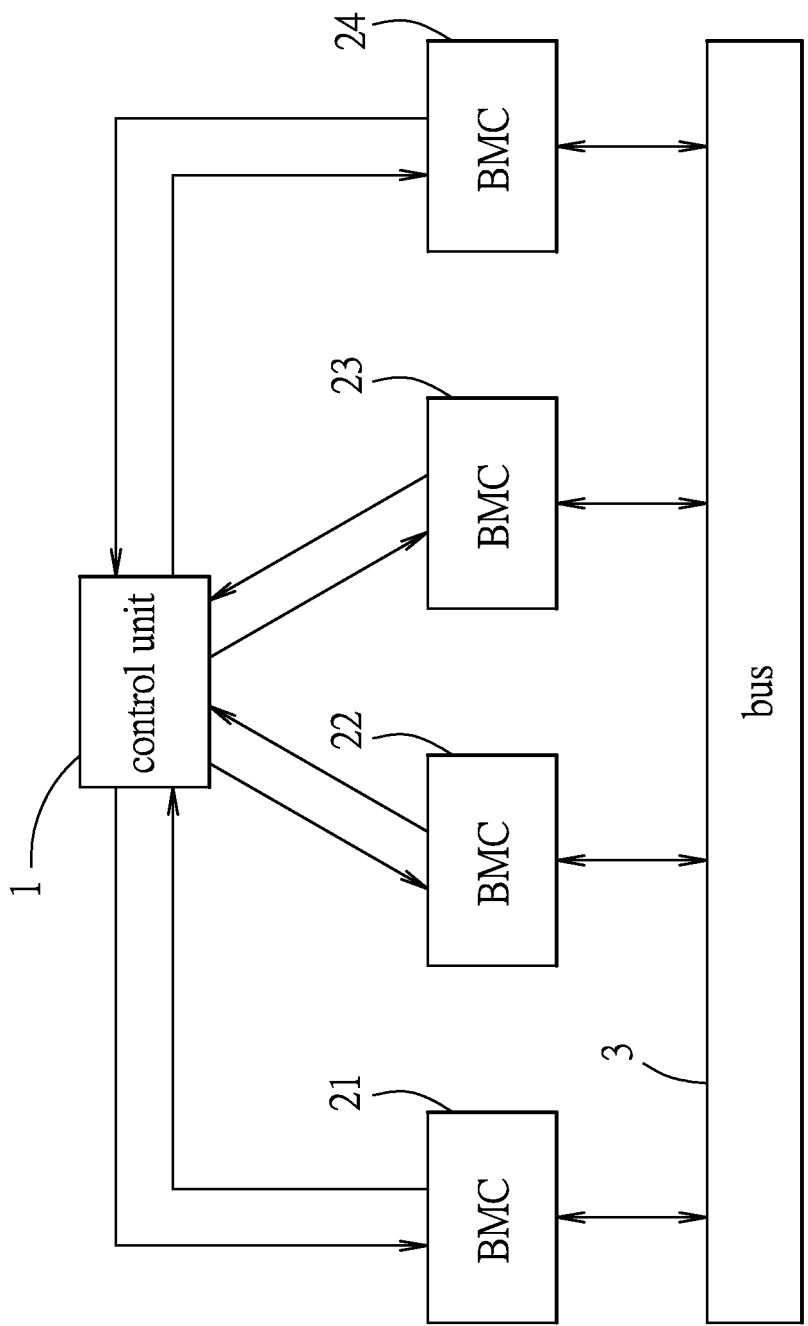
FIG. 2 is block diagram illustrating an embodiment of a system for monitoring a to-be-monitored unit of a rack according to the disclosure.

Referring to FIG. 2, an embodiment of a system for monitoring a to-be-monitored unit of a rack is described below. The system includes a control unit 1, a plurality of, e.g., four, baseboard management controllers (BMCs) 21-24, and a bus 3. The system is for use in a computer system including the rack, which in this embodiment is a server rack. The computer system further includes four baseboards (not shown) as four nodes, and four fan units (not shown). Each fan unit includes a plurality of fans (not shown). In other embodiment, the number of fans in each fan unit may be one or plural.

The BMCs 21-24 of the system are respectively disposed on the baseboards and are respectively and electrically connected to the fan units, cooperatively serving as the to-be-monitored unit herein. The BMCs 21-24 are further electrically connected to the control unit 1, and the bus 3. The bus 3 supports an intelligent platform management interface (IPMI) and is an intelligent platform management bus (IPMB). In other embodiment, the bus 3 may support one of serial input/output (serial I/O) and local area network (LAN).

Each of the BMCs 21-24 is configured to generate a heartbeat signal and to acquire operation data associated with the fan unit once completely initiated. The operation data includes for example, temperature and speed of rotation of each fan of the fan unit. Note that in practice, the operation data, such as the temperature of each node, may be detected by a temperature sensor disposed adjacent to the CPU or front/back side on the baseboard. For each of the BMCs 21-24, once completely initiated and operating normally, the heartbeat signal has a logic value reciprocating between a first logic value and a second logic value at a frequency of e.g., 0.5 Hz or 1 Hz, and once completely initiated and operating abnormally, the heartbeat signal continues to be at one of the first logic value and the second logic value. One of the first logic value and the second logic value is logic 1 and the other of the first logic value and the second logic value is logic 0. For example, the heartbeat signal is at logic 0 once completely initiated and operating abnormally. Note that the generation of the heartbeat signals and the acquisition of the operation data are continuously performed after completing the initiation of the BMCs 21-24.

Figure 3:
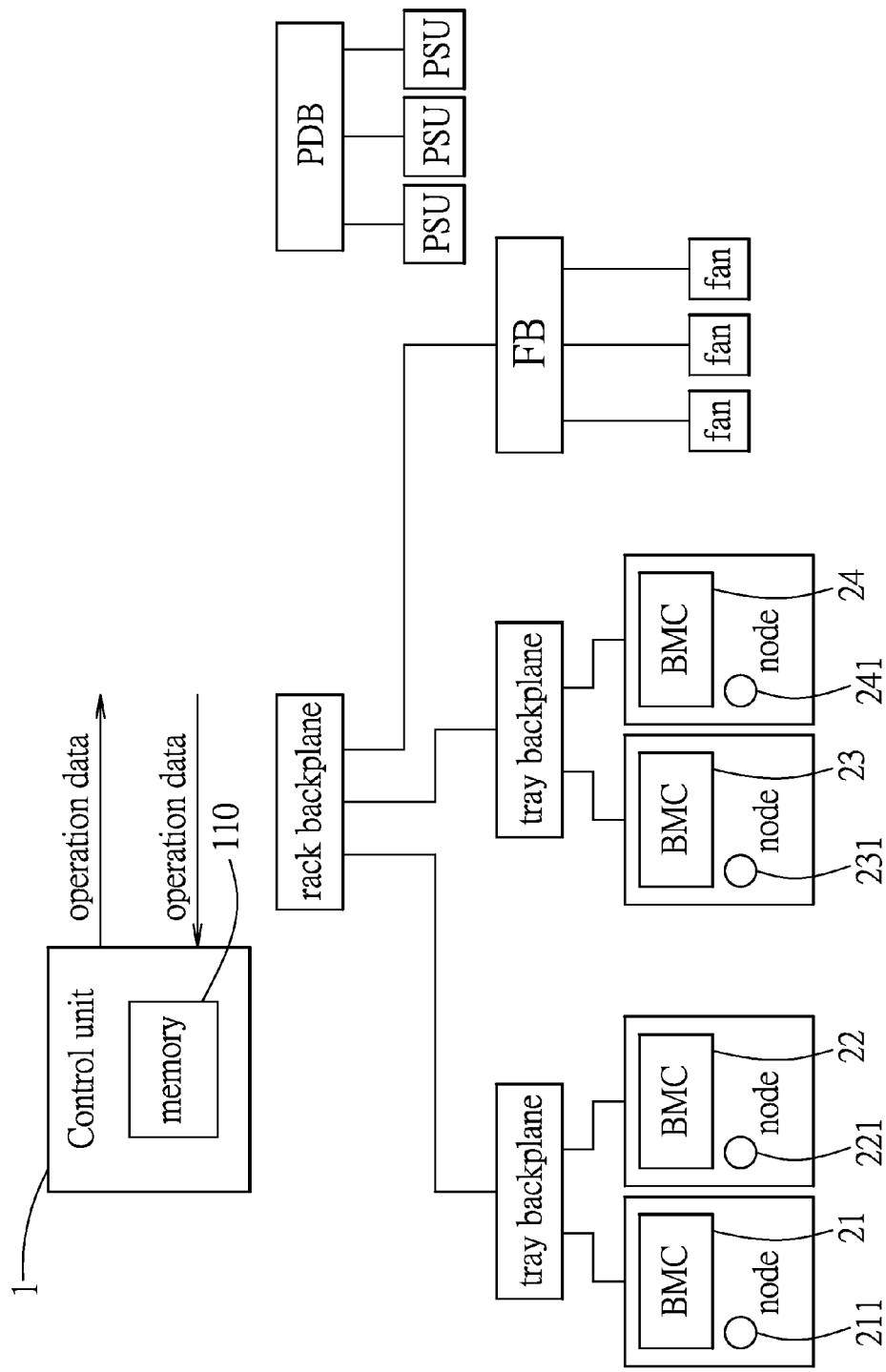
FIG. 3 is a block diagram illustrating another embodiment of a system for monitoring a to-be-monitored unit of a rack according to the disclosure.

Each of the BMCs 21-24 is configured to operate in one of a master mode and a slave mode according to a corresponding decision signal. In one embodiment, the first normally operating one of the BMCs 21-24 operates in the master mode. It is noted that "the first normally operating one of the BMCs 21-24" may refer to one of the BMCs 21-24 that is the earliest to operate normally, or one of the BMCs 21-24 that is the soonest in operating normally. In this embodiment, the BMC 21 is the first normally operating BMC, so the BMC 21 operates in the master mode. The BMC which operates in the master mode, e.g., the BMC 21, is configured to receive via the bus 3 the operation data from the rest of the BMCs which operate in the slave mode, e.g., the BMCs 22-24, in order to possess all monitoring data on the fan unit. In another embodiment depicted in FIG. 3, the control unit 1 includes a memory 110 and the BMCs 21-24 transmit the operation data to the control unit 1 to be stored in the memory 110. It is noted that the place where the control unit 1 may be disposed at is not to be limited. The BMC which operates in the master mode is configured to access the memory 110 to retrieve the operation data acquired by the BMCs 21-24. In such case, the bus 3 may be omitted. Moreover, the BMC operating in the master mode (BMC 21) is further configured to control the speed of rotation of the fans of the fan unit to adjust the temperature inside the rack according to the operation data acquired thereby and the operation data received thereby from the BMCs (BMCs 21-24). Essentially, the BMC operating in the master mode serves the function of a rack/chassis management controller (RMC/CMC), in addition to serving the functions of a regular BMC.

The control unit 1 in this embodiment is a micro control unit, is electrically connected to the BMCs 21-24 for receiving the heartbeat signals generated thereby, and is configured to, according to the heartbeat signals, generate the corresponding decision signals for the BMCs 21-24 and transmit the corresponding decision signals respectively to the BMCs 21-24, for controlling one of the BMCs 21-24 to operate in the master mode and the rest of the BMCs 21-24 to operate in the slave mode. In detail, for example, when it is detected by the control unit 1 that the heartbeat signal from the BMC 21 is the first one among the BMCs 21-24 to reciprocate between the first and second logic values, the control unit 1 is configured to, for the first normally operating one of the BMCs 21-24 (e.g., BMC 21), change a logic value of the corresponding decision signal from a third logic value to a fourth logic value such that the first normally operating BMC 21 operates in the master mode, and to make the logic value of the decision signals for each of the rest of the BMCs 22-24 stay at the third logic value such that the rest of the BMCs 22-24 each operate in the slave mode. One of the third logic value and the fourth logic value is logic 1 and the other of the third logic value and the fourth logic value is logic 0. For example, the third logic value is logic 1 and the fourth logic value is logic 0, but this disclosure is not limited to the above.

The control unit 1 is configured to determine that the BMC 21 which operates in the master mode becomes abnormal when the logic value of the heartbeat signal thereof does not reciprocate between the first logic value and the second logic value. The control unit 1 is further configured to, for one of the rest of the BMCs 22-24, the logic value of the heartbeat signal generated by which reciprocates between the first and second logic values, change the logic value of the corresponding decision signal from the third logic value to the fourth logic value. The control unit 1 is further configured to determine the one of the rest of the BMCs 22-24 according to a predetermined order among the rest of the BMCs 22-24. The predetermined order is, for instance, related to positions of the baseboards on which the BMCs 22-24 are disposed. As an example, once the BMC 21 becomes abnormal, the BMC 23 which generates the heartbeat signal that reciprocates between the first and the second logic values is switched to operating in the master mode and serves the functions of a RMC/CMC.

In the above exemplified embodiment, the system is used for monitoring a plurality of fan units. In other embodiments, the to-be-monitored unit may include a plurality of hardware elements, and the BMCs are to be electrically connected to the hardware elements, and the operation data is related to operation status of the hardware elements. Moreover, the hardware elements of the to-be-monitored unit are multiple ones of a plurality of nodes, a plurality of fan units, a plurality of temperature sensors 211, 221, 231, 241, a plurality of power supply units, and a plurality of hardware discs. It is noted that the hardware discs may be electrically connected to tray backplane (not shown), but not limited thereto. The operation data may include at least one of temperature, power consumption, SN (serial number) information, ID (identification), power status, power on status, health status, configuration (e.g., associated with CPU, memory, hard disc, BIOS/BMC version), or on-off control of the nodes when the hardware elements of the to-be-monitored unit are a plurality of nodes. When the hardware elements are a plurality of power supply units, the operation data may include at least one of input power, output power, input voltage, output voltage, input current, output current, on/off control, status, or working temperature of the power supply units.

In sum, the control unit 1 is electrically connected to the BMCs 21-24 for receiving the heartbeat signals generated thereby, and is configured to, according to the heartbeat signals, generate the corresponding decision signals for the BMCs 21-24 and transmit the corresponding decision signals respectively to the BMCs 21-24, for controlling a first normally operating one of the BMCs to operate in the master mode and the rest of the BMCs to operate in the slave mode. The BMC which operates in the master mode is further configured to monitor and/or control the to-be-monitored unit according to the operation data acquired thereby. That the RMC/CMC is omitted and the function and the circuit of the control unit 1 are simple and low level makes the overall complexity and the cost of the system lower.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for monitoring a to-be-monitored unit of a rack, comprising:
a bus;
a plurality of baseboard management controllers (BMCs) to be electrically connected the to-be-monitored unit, each of said BMCs being configured to generate a heartbeat signal and to acquire operation data associated with the to-be-monitored unit once completely initiated, and to operate in one of a master mode and a slave mode according to a corresponding decision signal, one of said BMCs which operates in the master mode being configured to receive via said bus the operation data from the rest of said BMCs which operate(s) in the slave mode; and
a control unit electrically connected to said BMCs for receiving the heartbeat signals generated thereby, and configured to, according to the heartbeat signals, generate the corresponding decision signals for said BMCs and transmit the corresponding decision signals respectively to said BMCs, for controlling a first normally operating one of said BMCs to operate in the master mode and the rest of said BMCs to operate in the slave mode;
wherein each of said BMCs is configured to generate the heartbeat signal which has a logic value reciprocating between a first logic value and a second logic value once said BMC is completely initiated and operates normally, and said control unit is configured to, for the first normally operating one of said BMCs, change a logic value of the corresponding decision signal from a third logic value to a fourth logic value such that the first normally operating one of said BMCs operates in the master mode,
wherein the first normally operating one of said BMCs which operates in the master mode is configured to perform at least one of control or monitoring of the to-be-monitored unit in place of a rack/chassis management controller (RMC/CMC), and
wherein said control unit is configured to, for one of the rest of said BMCs, the logic value of the heartbeat signal generated by which reciprocates between the first and second logic values, change the logic value of the corresponding decision signal from the third logic value to the fourth logic value when the first normally operating one of said BMCs which operates in the master mode becomes abnormal.

2. The system as claimed in claim 1, wherein said control unit is configured to determine that the first normally operating one of said BMCs which operates in the master mode becomes abnormal when the logic value of the heartbeat signal generated by the first normally operating one of said BMCs does not reciprocate between the first logic value and the second logic value.

3. The system as claimed in claim 2, wherein said control unit is configured to, from among the rest of said BMCs, determine said one of the rest of said BMCs according to a predetermined order.

4. The system as claimed in claim 3, the rack including a plurality of baseboards, wherein said BMCs are to be respectively disposed on the baseboards, the predetermined order being related to positions of the baseboards on which said BMCs are disposed.

5. The system as claimed in claim 2, the to-be-monitored unit including a plurality of hardware elements, wherein said BMCs are to be electrically connected to the to-be-monitored unit, the operation data being related to operation status of the hardware elements.

6. The system as claimed in claim 5, the hardware elements of the to-be-monitored unit being multiple ones of a plurality of nodes, a plurality of fan units, a plurality of temperature sensors, a plurality of power supply units, and a plurality of hardware discs.

7. The system as claimed in claim 6, the hardware elements of the to-be-monitored unit being a plurality of nodes, wherein the operation data includes at least one of temperature, power consumption, SN information, ID, power status, power on status, health status, configuration, or on-off control of the nodes.

8. The system as claimed in claim 6, the hardware elements being a plurality of power supply units, wherein the operation data includes at least one of input power, output power, input voltage, output voltage, input current, output current, on/off control, status, or working temperature of the power supply units.

9. The system as claimed in claim 2, the to-be-monitored unit including a plurality of fan units, wherein each of said BMCs is to be electrically connected to a corresponding one of the fan units, and is configured to, when operating normally, detect the corresponding one of the fan units to acquire operation information associated with the corresponding one of the fan units to serve as the operation data.

10. The system as claimed in claim 1, wherein said bus supports one of intelligent platform management interface (IPMI), serial I/O, and local area network (LAN), and said bus is an intelligent platform management bus (IPMB) when said bus supports IPMI.

11. The system as claimed in claim 1, wherein said one of said BMCs which operates in the master mode is configured to perform at least one of control or monitoring of the to-be-monitored unit according to the operation data acquired thereby and the operation data received thereby from the rest of said BMCs which operate(s) in the slave mode.

12. The system as claimed in claim 1, wherein said BMCs are configured to transmit the operation data to said control unit, said control unit includes a memory for storing the operation data received from said BMCs.

13. A system for monitoring a to-be-monitored unit of a rack, comprising:
a bus;
a plurality of baseboard management controllers (BMCs) to be electrically connected the to-be-monitored unit, each of said BMCs being configured to generate a heartbeat signal and to acquire operation data associated with the to-be-monitored unit once completely initiated, and to operate in one of a master mode and a slave mode according to a corresponding decision signal, one of said BMCs which operates in the master mode being configured to receive via said bus the operation data from the rest of said BMCs which operate(s) in the slave mode; and a control unit electrically connected to said BMCs for receiving the heartbeat signals generated thereby, and configured to, according to the heartbeat signals, generate the corresponding decision signals for said BMCs and transmit the corresponding decision signals respectively to said BMCs, for controlling a first normally operating one of said BMCs to operate in the master mode and the rest of said BMCs to operate in the slave mode;

wherein each of said BMCs is configured to generate the heartbeat signal which has a logic value reciprocating between a first logic value and a second logic value once said BMC is completely initiated and operates normally, and said control unit is configured to, for the first normally operating one of said BMCs, change a logic value of the corresponding decision signal from a third logic value to a fourth logic value such that the first normally operating one of said BMCs operates in the master mode, and wherein each of said BMCs is configured to generate the heartbeat signal which is at one of the first logic value and the second logic value once being completely initiated and operating abnormally.

14. The system as claimed in claim 13, wherein one of the first logic value and the second logic value is logic 1 and the other of the first logic value and the second logic value is logic 0.

15. The system as claimed in claim 13, wherein one of the third logic value and the fourth logic value is logic 1 and the other of the third logic value and the fourth logic value is logic 0.

16. The system as claimed in claim 13, wherein each of said BMCs is configured to generate the heartbeat signal that reciprocates between the first logic value and the second logic value at a frequency of 0.5 Hz once completely initiated and operating normally.

17. The system as claimed in claim 13, wherein each of said BMCs is configured to generate the heartbeat signal that reciprocates between the first logic value and the second logic value at a frequency of 1 Hz once completely initiated and operating normally.

18. The system as claimed in claim 13, wherein the first normally operating one of said BMCs which operates in the master mode is configured to perform at least one of control or monitoring of the to-be-monitored unit in place of a rack/chassis management controller (RMC/CMC).

19. The system as claimed in claim 18, wherein said control unit is configured to, for one of the rest of said BMCs, the logic value of the heartbeat signal generated by which reciprocates between the first and second logic values, change the logic value of the corresponding decision signal from the third logic value to the fourth logic value when the first normally operating one of said BMCs which operates in the master mode becomes abnormal.

20. The system as claimed in claim 19, wherein said control unit is configured to determine that the first normally operating one of said BMCs which operates in the master mode becomes abnormal when the logic value of the heartbeat signal generated by the first normally operating one of said BMCs does not reciprocate between the first logic value and the second logic value; and wherein said control unit is configured to, from among the rest of said BMCs, determine said one of the rest of said BMCs according to a predetermined order.

* * * * *